Figure 1:
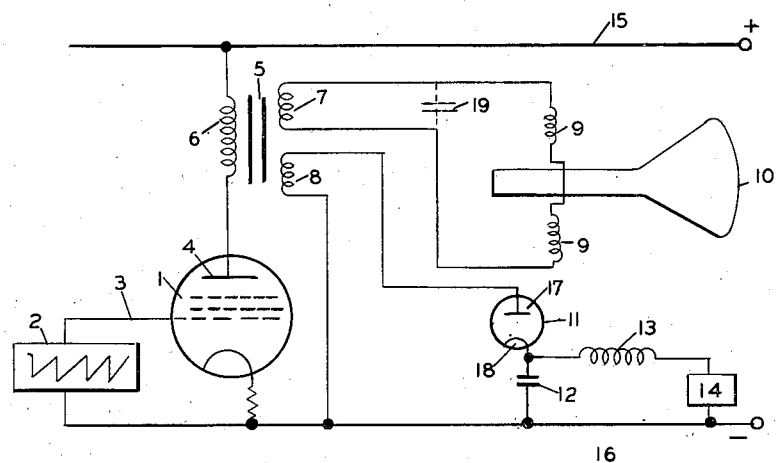

April 19, 1949.   C. L. RICHARDS   2,467,699
ELECTRIC TIME BASE CIRCUITS
Filed March 18, 1946

CLAUDE LANGDON RICHARDS
INVENTOR

BY
ATTORNEY.

Patented Apr. 19, 1949

2,467,699

UNITED STATES PATENT OFFICE 2,467,699

ELECTRIC TIME BASE CIRCUITS

Claude Langdon Richards, London, England, assignor to The Mullard Radio Valve Company Limited, London, England, a British company Application March 18, 1946, Serial No. 655,072
In Great Britain October 9, 1944

Section 1, Public Law 690, August 8, 1946
Patent expires October 9, 1964

8 Claims. (Cl. 315—27)

The present invention relates to electric time base circuits of the type used for electromagnetic deflection of the electron beam in a cathode-ray tube or similar device.

The deflecting coils necessary for such an operation are generally supplied with current of sawtooth waveform if a time linear traverse of the electron beam is required across the cathode-ray tube screen, the sawtooth waveform being comprised of a relatively long stroke in one direction responsible for producing the said time linear traverse, followed by a relatively short stroke or "flyback."

It is well-known that the change of current occurring during the "flyback" period of the sawtooth wave may produce very high voltages across the deflector coils by virtue of the self-induction of the latter, if the flyback period is short. These high voltages normally result in a dissipation of energy in resistances which are either placed or exist effectively in parallel with the deflector coils. In order that this dissipation of energy may be reduced it has been proposed in British specification 463,253 to obtain a unidirectional operating voltage for cathode-ray tube apparatus by deriving from electromagnetic deflection windings a voltage generated there across by self-induction and rectifying the voltage thus derived.

One of the objects of the present invention is to effect improvements in the efficiency by which a unidirectional voltage is obtained from the deflection coils or circuits associated therewith.

Another of the objects of this invention is the utilisation of the said unidirectional voltage in a novel manner.

According to one aspect of the invention an electric time-base circuit for cathode-ray tubes, comprising a rectifier associated with electromagnetic deflecting coils for the purpose of deriving a unidirectional voltage from the voltage peaks produced across the said coils by rapid changes of current therein, is characterised in that the rectifier is also associated with a condenser which may be charged by way of the rectifier as a result of the said voltage peaks, the capacity of the condenser being such that the resonant period of oscillation of the condenser in parallel with other stray capacities and the inductance effectively in parallel with said condenser while the rectifier is conducting, is not greater than twice the duration of the longest permissible flyback time.

According to another aspect of the invention an electric time-base circuit for cathode-ray tubes comprising a rectifier associated with electromagnetic deflection coils for the purpose of deriving a unidirectional voltage from the voltage peaks produced across the said coils by rapid changes of current therein, is characterised in that the said rectifier is also associated with a direct voltage source supplying a load whereby the said unidirectional voltage assists the supply of current to the said load.

The two abovementioned aspects of the invention may also be combined.

Figure 2:
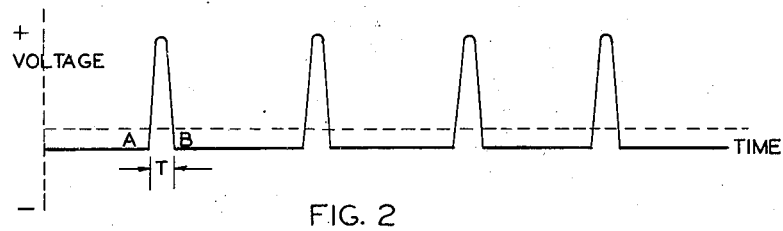
Figure 3:
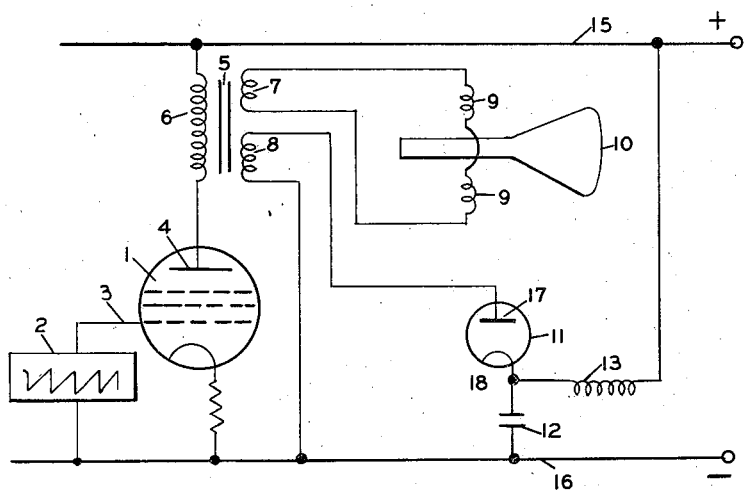

In order that the invention may be better understood reference will now be made to the accompanying drawings, in which:

Figure 1 shows a circuit diagram of a preferred arrangement according to the first aspect above referred to, Figure 2 illustrates the time variation of voltage across a winding, while Figure 3 shows a preferred arrangement according to the second aspect.

In Figure 1 a thermionic valve 1 which may be of the pentode type as shown, is supplied at its control grid 3 with voltage of sawtooth waveform 2. The anode of the valve is connected by way of primary winding 6 of transformer 5 to a positive voltage line 15. The transformer 5 has secondary and tertiary windings 7 and 8 respectively. Winding 7 is connected to deflecting coil windings 9 arranged adjacent a cathode-ray tube shown schematically by 10. Winding 8 has one end connected to a negative supply line 16. The other end of winding 8 is connected to the anode 17 of a rectifier valve 11, whose cathode is connected by way of a condenser 12 to the negative supply line 16. The cathode 18 of rectifier valve 11 is also connected by way of an impedance to alternating currents, shown in the figure as a choke 13, and thence to a load 14. Small stray capacities indicated at 19 in Figure 1 occur predominantly in the circuit of the coils 9 but also to a smaller extent in the circuit of the winding 8.

When the sawtooth frequency is so high that the self-induction of the deflecting coils 9 rather than the resistance, determines the voltage across these coils and therefore the voltage across windings 6 and 8 of transformer 5, the time variation of waveform of this voltage is substantially as shown in Figure 2. The condenser 12 will be charged up during the voltage peak A, B (Figure 2) which will at the same time be modified in form. For maximum efficiency the condenser 12 together with the above-mentioned small stray capacities which are effectively present across winding 8 should have a total capacity such that in combination with the effective inductance present across winding 8, the resonant period of oscillation of the combination is twice the duration of the voltage peak A, B, i. e. twice the time $t$ shown in Figure 2. At the end of voltage peak A B condenser 12 then discharges by way of choke 13 in known manner to supply load 14 with current. A further condenser (not shown) may be connected across the load to smooth out fluctuations in the load voltage.

The impedance shown in Figure 1 by choke 13 is preferably of sufficiently high value that the oscillatory nature of the charging of condenser 12 is not effected by the load 14.

Various modifications may be made in the circuit of Figure 1 without fundamental change in the mode of operation. Thus, for example, the transformer winding 8 may be omitted and the anode 17 of the diode 11 connected directly to a point between the anode 4 of the valve 1 and the transformer winding 6.

In Figure 3 is illustrated a preferred arrangement according to the second aspect of the present invention. A thermionic valve 1 which is shown here of the pentode type is supplied at its control grid 3 with sawtooth waveform 2, having its anode connected to the primary winding 6 of a transformer 5 having a secondary winding 7 and tertiary winding 8. Secondary winding 7 is connected to deflecting coils 9 adjacent a cathode-ray tube 10. Tertiary winding 8 is connected at one of its ends to a negative supply line 16 and at the other end to the anode 17 of rectifier 11. The cathode 18 of the rectifier 11 is also connected to the positive supply line 15.

The waveform occurring at winding 8 on open-circuit is again as shown in Figure 2. When winding 8 is connected as shown and suitably phased so that the voltage peaks A, B (Figure 2) are in the positive direction, current will be supplied to the positive power supply line 15, during the period when the said voltage peak exceeds the voltage of the power supply line, the winding 8 being so arranged that an excess of voltage is possible. The power supply lines 15, 16, are assumed to have storage means such as a condenser connected across them so that the current pulses delivered through rectifier 11 do not cause an appreciable ripple voltage on this line. Alternatively the rectifier 11 may be disconnected from the power line 15 and joined to a filter circuit of any known type from which current may then be supplied substantially free from ripple voltage to the power supply line 15. As a further alternative the circuit of Figure 1 may be combined with that of Figure 3 the load 14 being disconnected and the free end of choke 13 joined to the positive power supply line 15 condenser 12 should have a value as determined above.

In circuits of the type shown in Figure 3 the advantage is obtained that power which would otherwise be dissipated in resistance either placed or existing in parallel with the deflecting coils, is directed back into the power supply circuit, with the result that the overall efficiency of the circuit is increased. The thermionic valve 1, the coupling transformer 5 and the deflection coils 9 operate in general with reduced dissipation as a result of these measures.

Instead of the rectifier 11 in Figure 3 being connected to the time base power supply line 15, it may be connected to any other direct voltage power supply line, having a return conductor joined to the end of winding 8 shown connected to line 16.

The rectifier 11 referred to in the drawings although shown and described as a rectifier of the discharge tube type may be replaced by any other rectifier of similar efficiency.

I claim:

1. In combination; an inductive load, means to supply a sawtooth current to said load, said sawtooth current having a predetermined flyback time, a rectifier coupled to said load to derive a unidirectional pulse from the voltage surge produced across said load during said flyback time, and a condenser interposed between said rectifier and said load, said condenser having a value at which the resonant period of oscillation of the inductance and stray capacities effectively connected in parallel relation with said condenser is substantially equal to twice the duration of said flyback time.

2. In combination; a cathode-ray deflecting coil, means for supplying a sawtooth current having a predetermined flyback time to energize said coil, a rectifier coupled to said coil to derive a unidirectional pulse from the voltage surge produced across said coil during said flyback time, and a condenser interposed between said rectifier and said coil, said condenser having a value at which the resonant period of oscillation of the inductance and stray capacities effectively connected in parallel relation with said condenser is substantially equal to twice the duration of said flyback time.

3. In combination; a cathode-ray deflecting coil, a transformer having a primary, a secondary and a tertiary, a diode rectifier, a condenser connected in series with said diode rectifier across said tertiary, means connecting said secondary to said deflecting coil, and means for supplying a sawtooth current to said primary, said sawtooth current having a predetermined flyback time, said condenser having a value at which the resonant period of oscillation of the inductance and stray capacities effectively connected in parallel relation with said condenser is substantially equal to twice the duration of said flyback time.

4. In combination; a cathode-ray deflecting coil, a transformer having a primary, a secondary and a tertiary, a source of direct potential, an electron discharge device having a control grid, said device being connected in series with said primary across said source, means to impress a sawtooth voltage on said control grid whereby a sawtooth current having a predetermined flyback time flows through said primary, means connecting said secondary to said deflecting coil, a diode rectifier, and a condenser connected in series with said diode rectifier across said tertiary, said condenser having a value at which the resonant period of oscillation of the inductance and stray capacities effectively connected in parallel relation with said condenser is substantially equal to twice the duration of said flyback time.

5. In combination; a cathode-ray deflecting coil, a transformer having a primary, a secondary and a tertiary, a source of direct potential, an electron discharge device having a control grid, said device being connected in series with said primary across said source, means to impress a sawtooth voltage on said control grid whereby a sawtooth current having a predetermined flyback time flows through said primary, means connecting said secondary to said deflecting coil, a diode rectifier, a condenser connected in series with said diode rectifier across said tertiary, said condenser having a value at which the resonant period of oscillation of the inductance and stray capacities effectively connected in parallel relation with said condenser is substantially equal to twice the duration of said flyback time, a direct-current load, and a filter for coupling said condenser to said load.

6. In a time base circuit for a cathode-ray tube having a deflecting coil, the combination comprising a generator for supplying a sawtooth current having a predetermined flyback time to the deflecting coil, a source of direct potential for energizing said generator, a rectifier coupled to said coil to derive a unidirectional pulse from the voltage surge set up across said coil during said flyback time, a condenser interposed between said rectifier and said coil, said condenser having a value at which the resonant period of oscillation of the inductance and stray capacities effectively connected in parallel relation with said condenser is substantially equal to twice the duration of said flyback time, and means to apply the unidirectional voltage established across said condenser to said source.

7. In a time base circuit for a cathode-ray tube having a deflecting coil, the combination comprising a transformer having a primary, a secondary and a tertiary, a source of direct potential, an electron discharge device having a control electrode, said device being connected in series with said primary across said source, means to impress a sawtooth voltage on said control electrode whereby a sawtooth current having a predetermined flyback time flows through said primary, means connecting said secondary to said coil, a diode rectifier, a condenser connected in series with said rectifier across said tertiary, said condenser having a value at which the resonant period of oscillation of the inductance and stray capacities effectively connected in parallel relation with said condenser is substantially equal to twice the duration of said flyback time, and means to apply the unidirectional voltage established across said condenser to said source.

8. In a time base circuit for a cathode-ray tube having a deflecting coil, the combination comprising a transformer having a primary, a secondary and a tertiary, a source of direct potential, an electron discharge device having a cathode connected to the negative terminal of said source, a control grid and an anode connected through said primary to the positive terminal of said source, means to impress a sawtooth voltage on said control grid whereby a sawtooth current having a predetermined flyback time flows through said primary, means connecting said secondary to said coil, a condenser, a diode rectifier having a cathode connected through said condenser to one end of said tertiary and the negative terminal of said source and an anode connected to the other end of said tertiary, and a filter inductor connected between the cathode of said rectifier and the positive terminal of said source, said condenser having a value at which the resonant period of oscillation of the inductance and stray capacities effectively connected in parallel relation with said condenser is substantially equal to twice the duration of said flyback time.

CLAUDE LANGDON RICHARDS.

REFERENCES CITED

The following references are of record in the file of this patent:

UNITED STATES PATENTS

| Number | Name | Date |
| --- | --- | --- |
| 2,280,990 | White | Apr. 28, 1942 |
| 2,282,895 | Shepard, Jr. | May 12, 1942 |
| 2,284,101 | Robins | May 26, 1942 |
| 2,284,378 | Dome | May 26, 1942 |
| 2,308,908 | Bahring | Jan. 19, 1943 |
| 2,373,165 | Cawein | Apr. 10, 1945 |
| 2,412,485 | Whitely | Dec. 10, 1946 |
| 2,412,542 | Smith | Dec. 10, 1946 |
| 2,413,063 | Miller | Dec. 24, 1946 |

FOREIGN PATENTS

| Number | Country | Date |
| --- | --- | --- |
| 482,370 | Great Britain | Mar. 28, 1938 |
| 826,750 | France | Jan. 12, 1938 |